United States Patent
Focke et al.

(10) Patent No.: US 12,059,828 B2
(45) Date of Patent: Aug. 13, 2024

(54) METHOD FOR FILLING A MULTI-CHAMBER PROFILE WITH FOAM, BODY AND MOTOR VEHICLE

(71) Applicant: Bayerische Motoren Werke Aktiengesellschaft, Munich (DE)

(72) Inventors: Lars Focke, Hallbergmoos (DE); Maxim Schreider, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/719,897

(22) Filed: Apr. 13, 2022

(65) Prior Publication Data
US 2022/0332024 A1     Oct. 20, 2022

(30) Foreign Application Priority Data
Apr. 14, 2021 (DE) .................. 10 2021 109 307.4

(51) Int. Cl.
| | |
|---|---|
| *B29C 44/34* | (2006.01) |
| *B29C 44/18* | (2006.01) |
| *B62D 25/04* | (2006.01) |
| *B62D 29/04* | (2006.01) |
| *B29K 75/00* | (2006.01) |
| *B29L 31/30* | (2006.01) |

(52) U.S. Cl.
CPC ............ *B29C 44/186* (2013.01); *B29C 44/34* (2013.01); *B62D 25/04* (2013.01); *B62D 29/043* (2013.01); *B29K 2075/00* (2013.01); *B29L 2031/30* (2013.01)

(58) Field of Classification Search
CPC ... B29C 44/186; B29C 44/34; B29K 2075/00; B29L 2031/30
USPC .......................................................... 264/46.4
See application file for complete search history.

(56) References Cited

U.S. PATENT DOCUMENTS

2020/0016807 A1*   1/2020   Hairer ................. B29C 45/1657

FOREIGN PATENT DOCUMENTS

| | | |
|---|---|---|
| DE | 195 38 457 A1 | 4/1997 |
| DE | 10 2011 015 453 A1 | 4/2012 |
| DE | 10 2014 221 387 A1 | 4/2016 |

(Continued)

OTHER PUBLICATIONS

English translation of DE102014221387 (Year: 2016).*

(Continued)

*Primary Examiner* — Jeffrey M Wollschlager
*Assistant Examiner* — Xue H Liu
(74) *Attorney, Agent, or Firm* — Crowell & Moring LLP

(57) ABSTRACT

A method for filling a multi-chamber profile with foam includes providing the multi-chamber profile, which is a closed hollow chamber profile with at least two chambers, where an inner wall is disposed between two chambers of the at least two chambers which are arranged directly on each other, where the inner wall separates the two chambers from each other, and where a first one of the two chambers has a foam inlet. The method further includes forming an opening in the inner wall where the opening connects the two chambers and introducing a flowable foam material via the foam inlet into the first one of the two chambers such that the foam material is distributed within the first one of the two chambers and is introduced via the opening into a second one of the two chambers.

5 Claims, 2 Drawing Sheets

(56) References Cited

FOREIGN PATENT DOCUMENTS

| | | |
|---|---|---|
| DE | 10 2015 100 907 B4 | 7/2016 |
| DE | 10 2015 219 453 A1 | 4/2017 |
| EP | 2 574 440 A1 | 4/2013 |

OTHER PUBLICATIONS

English translation of EP2574440 (Year: 2013).*
German Search Report issued in German application No. 10 2021 109 307.4 dated Jul. 13, 2021, with Statement of Relevancy (Six (6) pages).

* cited by examiner

METHOD FOR FILLING A MULTI-CHAMBER PROFILE WITH FOAM, BODY AND MOTOR VEHICLE

CROSS REFERENCE TO RELATED APPLICATION

This application claims priority under 35 U.S.C. § 119 from German Patent Application No. 10 2021 109 307.4, filed Apr. 14, 2021, the entire disclosure of which is herein expressly incorporated by reference.

BACKGROUND AND SUMMARY OF THE INVENTION

The invention relates to a method for filling a multi-chamber profile with foam. In addition, the invention relates to a body for a vehicle and to a motor vehicle.

When multi-chamber profiles are filled with foam, conventionally each profile chamber has to be filled from the outside with foam material via a separate injection site in the outer wall. Specifically in the case of multi-chamber profiles, a separate injection per profile chamber results in a lengthy amount of application time being required and additional costs for closure elements. In addition, due to structure and accessibility, the injection points cannot be selected randomly on the outer wall. A multiplicity of injection sites in the outer wall of the multi-chamber profile can significantly reduce the stability of the multi-chamber profile.

The document DE 195 38 457 A1 discloses a multi-chamber profile for forming a lateral longitudinal member of a motor vehicle. The multi-chamber profile has a supporting chamber and a receiving chamber which are separated from each other by a boundary wall.

The invention is based on the object of functionally improving a method mentioned at the beginning. In addition, the invention is based on the object of structurally and/or functionally improving a body mentioned at the beginning and of structurally and/or functionally improving a motor vehicle mentioned at the beginning.

A method for filling a multi-chamber profile with foam can comprise the step of: providing a multi-chamber profile. The multi-chamber profile can be a closed, such as a completely closed or partially closed, hollow chamber profile. The multi-chamber profile or hollow chamber profile can have at least two chambers, such as cavities. An inner wall can be arranged between two chambers arranged directly on each other, the inner wall separating the two chambers from each other. The inner wall can be arranged in the longitudinal direction of the multi-chamber profile. The inner wall can be arranged between two opposite side walls of the multi-chamber profile. The inner wall can be arranged substantially parallel to at least one side wall of the multi-chamber profile. One of the chambers can be provided with at least one foam inlet. The at least one foam inlet can be a foam inlet opening. The at least one foam inlet can be a bore, such as a through bore, in the outer wall of the multi-chamber profile, the bore in particular opening into the one chamber. The at least one foam inlet can be produced by drilling, such as drilling through, into the outer wall, such as the side wall or the end wall, of the multi-chamber profile. The multi-chamber profile can have a single foam inlet. The multi-chamber profile can be an extruded profile or can be produced from an extruded profile. The multi-chamber profile can be produced from a light metal, such as aluminum.

In the method, the at least two chambers can be connected to each other, in particular fluidically. An opening connecting the chambers can be provided or made/introduced in the inner wall of the multi-chamber profile.

The method can comprise the step of: forming an opening connecting the two chambers in the inner wall of the multi-chamber profile and/or providing the inner wall of the multi-chamber profile with an opening connecting the two chambers.

The two chambers lying next to each other can be connected to each other, in particular fluidically, by means of a bore, such as a through bore. A through opening, such as a bore or a through bore, can be drilled and/or milled into the inner wall of the multi-chamber profile through the at least one foam inlet of the one chamber. The through opening thereby produced in the inner wall of the multi-chamber profile can connect the two chambers lying next to each other to each other, in particular fluidically. The through opening in the inner wall of the multi-chamber profile can be produced separately from or at the same time as the foam inlet or the bore in the outer wall of the multi-chamber profile. The drilling and/or milling can take place substantially in the transverse direction of the multi-chamber profile.

The two chambers lying next to each other can be connected to each other, in particular fluidically, by means of an inner wall bore. A through opening, such as a through bore or through milling, can be drilled and/or milled into the inner wall of the multi-chamber profile, for example substantially along the inner wall, through an outer wall, such as a side wall or end wall, of the multi-chamber profile. The through opening can be produced substantially along the inner wall and/or substantially in the longitudinal direction of the inner wall by drilling and/or milling. The through opening produced as a result in the inner wall of the multi-chamber profile can connect the two chambers lying next to each other to each other, in particular fluidically.

The two chambers lying next to each other can be connected to each other, in particular fluidically, by means of an end-side milling, such as a milled clearance, of the inner wall. In the method, an opening connecting the two chambers can be produced by end-side milling of the inner wall of the multi-chamber profile. An opening connecting the two chambers can be produced by an end-side milling or drilling, in particular of the inner wall.

In the method, the openings which are present and/or are produced in the outer wall of the multi-chamber profile can be closed again. The closing can take place by means of suitable sealing elements. The sealing element can be a sealing stopper or sealing pad. Foam can thereby be prevented from emerging from the multi-chamber profile during the injection. The foam inlet can be closed after the injection of foam.

The method can comprise the step of: introducing a flowable foam material via the foam inlet into the one chamber. The foam material can be distributed within the chamber. The foam material can pass or be introduced via the opening connecting the two chambers into the other chamber. The foam material can pass or be introduced via the openings connecting the chambers into the other, in particular into all the other, chambers of the multi-chamber profile. Flowable foam material can be introduced into a plurality of, for example all of, the chambers of the multi-chamber profile via the foam inlet of the one chamber.

The foam material can be expanded to form a solid foam. The foam material can be expanded to form a solid foam in such a manner that the foam substantially fills, for example substantially completely fills, a plurality of, in particular all of, the chambers of the multi-chamber profile. The foam material can have at least two components. For the expansion process, the at least two components can be mixed with one another. The foam material can comprise polyurethane (PU) and/or the like. The foam material, when being introduced, can be injected into the chamber by means of a nozzle and/or a mixing head. The foam which can be produced with the foam material can have a relatively high hardness and/or density. The foam material can be provided with substances which, for example, increase or improve pressure stability and/or energy absorption capability of the foam. For this purpose, the foam material can be designed to expand to form the foam in an exothermic reaction. The foam material can be expandable or expanded by activation, with heat being released.

A device for producing a multi-chamber profile can be designed and/or suitable and/or intended for carrying out the method described above and/or below. The device can have a receiving mold, for example a closable receiving mold, and/or a receiving tool for receiving and/or holding the multi-chamber profile. The device can have an introducing unit, for example a mixing head and/or a nozzle, for introducing flowable foam material into the at least one foam inlet of the multi-chamber profile.

A multi-chamber profile can be produced by the method described above and/or below and/or can be formed as described above and/or below.

A body for a vehicle, such as a motor vehicle, can have at least one multi-chamber profile. A support, for example a longitudinal member or crossmember, can have at least one multi-chamber profile. A body pillar can have at least one multi-chamber profile. The multi-chamber profile of the body and/or of the support and/or of the body pillar can be produced by the method described above and/or below and/or can be formed as described above and/or below.

A motor vehicle can have a body and/or at least one multi-chamber profile. The body can be formed as described above and/or below. The multi-chamber profile can be produced by the method described above and/or below and/or can be formed as described above and/or below.

In summary, and in other words, the invention thus produces, inter alia, a method for filling multi-chamber profiles with foam. The chambers of a multi-chamber profile can be connected by openings and/or holes. With a single injection site, a plurality of chambers can be filled with foam simultaneously. The foam can be applied through an opening in the outer wall of the multi-chamber profile. The chambers of the multi-chamber profile can be connected to one another by holes and/or milled clearances such that the foam can penetrate from the chamber in which it is applied into the other chambers. The chambers can be connected, for example, by means of through bores from the outside through the inner wall/inner walls. Drilling or milling can take place directly along an inner wall. As a result, a particularly large opening can be produced for the passage of foam. The holes produced in the process in the outer walls can be closed again, for example with a sealing element, such as stoppers or pads, such that foam can be prevented from emerging. The chambers can also be connected at the ends of the profile by an end-side milled clearance in the inner wall. The multi-chamber profile can be an aluminum multi-chamber profile. The multi-chamber profile can serve for use in a body.

With the invention, a plurality of chambers of a multi-chamber profile are simultaneously filled with foam via a single injection site in the outer wall of the multi-chamber profile. The application time can be significantly reduced. The process can be carried out more effectively and more rapidly. The stability of the multi-chamber profile can be improved.

Other objects, advantages and novel features of the present invention will become apparent from the following detailed description of one or more preferred embodiments when considered in conjunction with the accompanying drawings.

Exemplary embodiments of the invention will be described in more detail below with reference to figures.

DETAILED DESCRIPTION OF THE DRAWINGS

Figure 1:
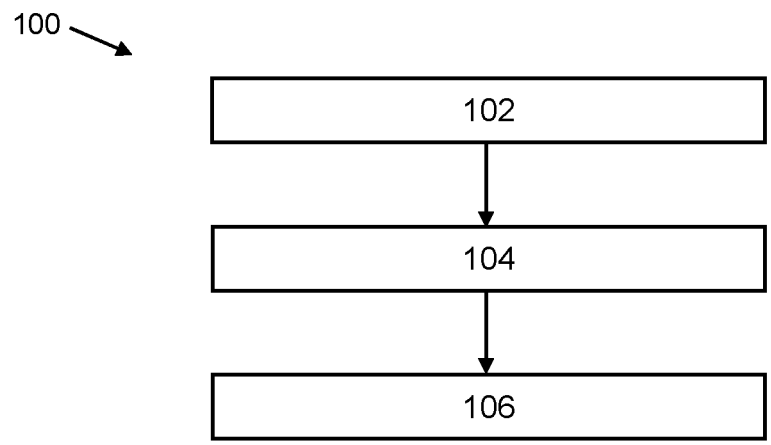
FIG. 1 shows a method for filling a multi-chamber profile with foam.

FIG. 1 shows schematically a process diagram for a method 100 for filling a multi-chamber profile with foam.

In a step 102, a multi-chamber profile is provided. The multi-chamber profile is a closed hollow chamber profile with at least two chambers, wherein an inner wall is arranged between two chambers arranged directly on each other, the inner wall separating the two chambers from each other, and wherein one of the chambers is provided with at least one foam inlet.

In a step 104, an opening connecting the two chambers is formed in the inner wall of the multi-chamber profile.

In a step 106, a flowable foam material is introduced via the foam inlet into the one chamber such that the foam material is distributed within the chamber and passes or is introduced via the opening connecting the two chambers into the other chamber. The foam material can have at least two components which, for the expansion process, are mixed with one another. The foam material, when being introduced, can be injected into the chamber by means of a nozzle and/or a mixing head. Flowable foam material can thus be introduced into a plurality of chambers via the foam inlet of the one chamber. The foam material can be expanded to form a solid foam in the process in such a manner that the foam substantially completely fills a plurality of, in particular all of, the chambers of the multi-chamber profile.

The openings which are present and/or are produced in the outer wall of the multi-chamber profile can be closed again.

Figure 2:
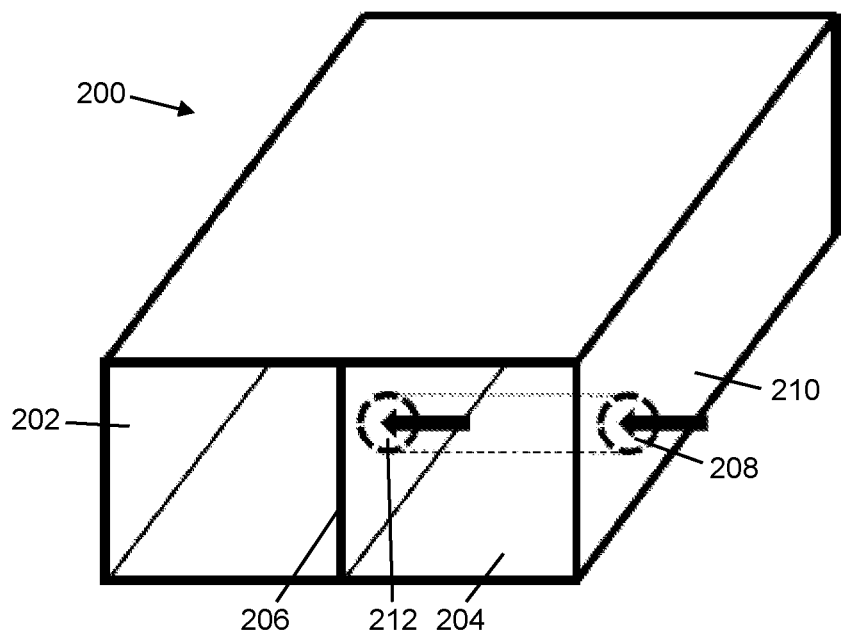
FIG. 2 shows a first variant of a multi-chamber profile.

FIG. 2 shows a first variant of a multi-chamber profile 200. The multi-chamber profile 200 is a closed hollow chamber profile with two chambers 202, 204. The two chambers 202, 204 are arranged directly on each other or next to each other.

An inner wall 206 is arranged between the two chambers 202, 204, the inner wall 206 separating the two chambers 202, 204 from each other. One of the chambers 202, 204 is provided with a foam inlet 208. The foam inlet 208 is designed as a foam inlet opening by means of a bore in the outer wall 210 or side wall 210.

A through opening 212, such as a through bore, is drilled and/or milled into the inner wall 206 of the multi-chamber profile 200 through the foam inlet 208 of the chamber 204. The flowable foam introduced through the foam inlet 208 can thus pass from the chamber 204 through the through opening 212 into the chamber 202 such that the two chambers 202, 204 can be simultaneously filled with foam via a single foam inlet opening 208.

The multi-chamber profile 200 can be part of a body and/or of a motor vehicle.

Otherwise, reference is additionally made in particular to FIG. 1 and the associated description.

Figure 3:
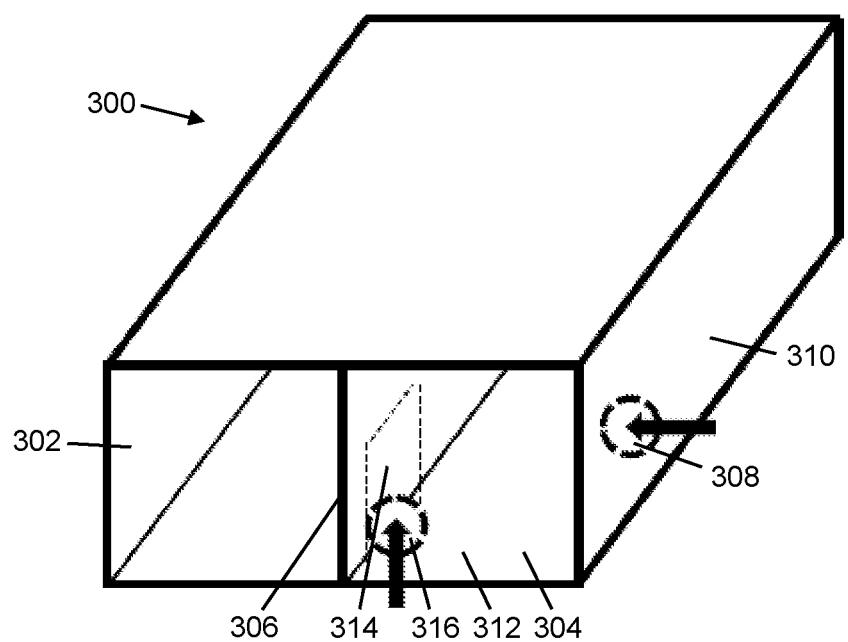
FIG. 3 shows a second variant of a multi-chamber profile.

FIG. 3 shows a second variant of a multi-chamber profile 300. The multi-chamber profile 300 is a closed hollow chamber profile with two chambers 302, 304. The two chambers 302, 304 are arranged directly on each other or next to each other.

An inner wall 306 is arranged between the two chambers 302, 304, the inner wall 306 separating the two chambers 302, 304 from each other. One of the chambers 302, 304 is provided with a foam inlet 308. The foam inlet 308 is designed as a foam inlet opening by means of a bore in the outer wall 310 or side wall 310.

A through opening 314, such as a through bore or through milling, is drilled and/or milled into the inner wall 306 of the multi-chamber profile 300, in particular substantially along the inner wall 306, through an end wall 312 of the multi-chamber profile 300. For the passage through the end wall 312 to the inner wall 306, an opening 316, for example a bore, can be introduced into the end wall 312, e.g., by drilling and/or milling. The opening 316 can then be closed again in order to prevent foam from emerging.

The flowable foam introduced through the foam inlet 308 can thus pass from the chamber 304 through the through opening 314 into the chamber 302 such that the two chambers 302, 304 can be simultaneously filled with foam via a single foam inlet opening 308.

The multi-chamber profile 300 can be part of a body and/or of a motor vehicle.

Otherwise, reference is additionally made in particular to FIGS. 1 and 2 and the associated description.

Figure 4:
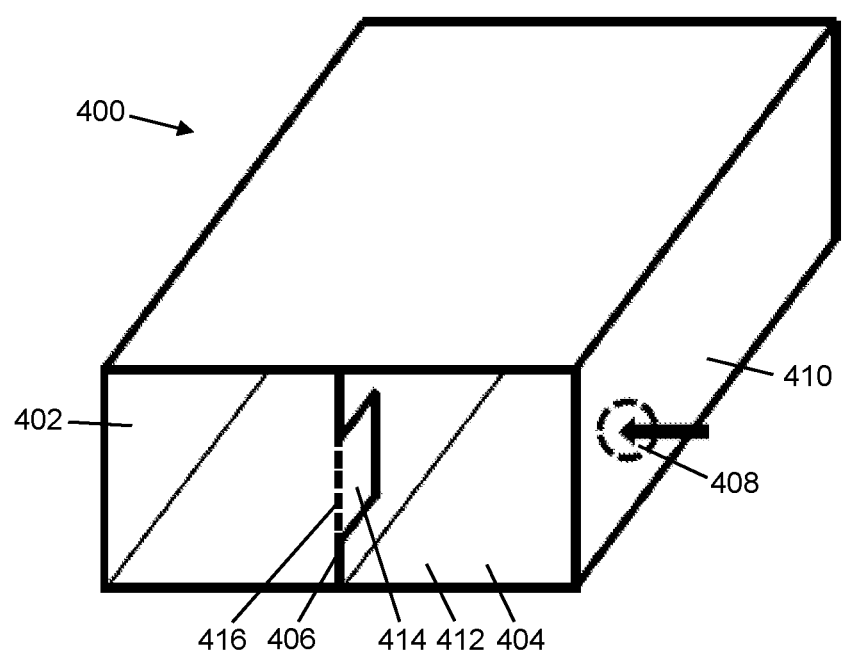
FIG. 4 shows a third variant of a multi-chamber profile.

FIG. 4 shows a third variant of a multi-chamber profile 400. The multi-chamber profile 400 is a closed hollow chamber profile with two chambers 402, 404. The two chambers 402, 404 are arranged directly on each other or next to each other.

An inner wall 406 is arranged between the two chambers 402, 404, the inner wall 406 separating the two chambers 402, 404 from each other. One of the chambers 402, 404 is provided with a foam inlet 408. The foam inlet 408 is designed as a foam inlet opening by means of a bore in the outer wall 410 or side wall 410.

An opening 414 connecting the two chambers 402, 404 is formed by an end-side milling or drilling of the inner wall 406 by way of the end wall 412 of the multi-chamber profile 400. The opening 414 forms a through opening 414. The opening 416 produced in the process in the end wall 412 can then be closed again in order to prevent foam from emerging.

The flowable foam introduced through the foam inlet 408 can thus pass from the chamber 404 through the through opening 414 into the chamber 402 such that the two chambers 402, 404 can be simultaneously filled with foam via a single foam inlet opening 408.

The multi-chamber profile 400 can be part of a body and/or of a motor vehicle.

Otherwise, reference is additionally made in particular to FIGS. 1 to 3 and the associated description.

"May" or "can" in particular denotes optional features of the invention. Accordingly, developments and/or exemplary embodiments of the invention that additionally or alternatively comprise the respective feature or the respective features are also provided.

It is also possible as required to extract features in isolation from the combinations of features disclosed in the present case and to use them in combination with other features to delimit the subject matter of the claims by defining a structural and/or functional relationship that may exist between the features. The sequence and/or number of steps of the method may be varied.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS

100 Method for filling a multi-chamber profile with foam
102 Step for providing a multi-chamber profile
104 Step for forming an opening connecting the chambers
106 Step for introducing flowable foam material
200 Multi-chamber profile
202 First chamber
204 Second chamber
206 Inner wall
208 Foam inlet
210 Outer wall or side wall
212 Through opening
300 Multi-chamber profile
302 First chamber
304 Second chamber
306 Inner wall
308 Foam inlet
310 Outer wall or side wall
312 End wall
314 Through opening in the inner wall
316 Opening in the end wall
400 Multi-chamber profile
402 First chamber
404 Second chamber
406 Inner wall
408 Foam inlet
410 Outer wall or side wall
412 End wall
414 Opening in the inner wall
416 Opening in the end wall

What is claimed is:

1. A method for filling a multi-chamber profile with foam, comprising the steps of:
providing the multi-chamber profile which is a completely closed hollow chamber profile with at least two chambers, wherein an inner wall is disposed between two chambers of the at least two chambers which are arranged directly on each other and wherein the inner wall separates the two chambers from each other;
drilling or milling a bore in an outer wall of a first one of the two chambers of the completely closed hollow chamber profile to form a foam inlet and, at a same time as the drilling or milling of the bore in the outer wall, drilling or milling through the bore in the outer wall a through bore in the inner wall, wherein the through bore connects the two chambers;
introducing a flowable foam material via the foam inlet into the first one of the two chambers such that the foam material is distributed within the first one of the two chambers and is introduced via the through bore into a second one of the two chambers; and after the introducing, closing the bore in the outer wall of the completely closed hollow chamber profile.

2. The method according to claim 1, wherein the flowable foam material is introduced into all of the at least two chambers via the foam inlet.

3. The method according to claim 1, wherein the foam material is expanded to form a solid foam such that the solid foam substantially completely fills the two chambers.

4. The method according to claim 1, wherein the foam material has at least two components which, for an expansion process of the foam material, are mixed with one another.

5. The method according to claim 1, wherein the introducing is by a nozzle or a mixing head.

* * * * *